Aug. 11, 1936.    D. J. DOLAN    2,050,426
CLUTCH
Filed July 14, 1934
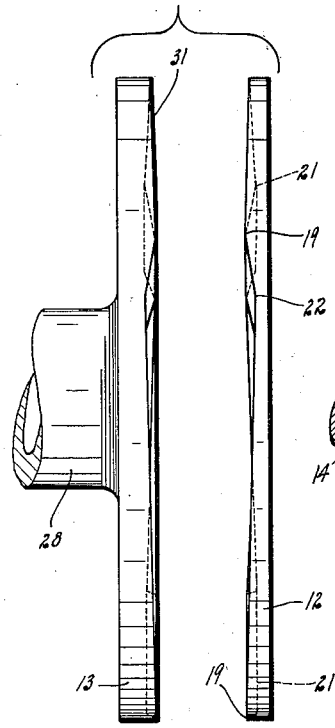
FIG.-2
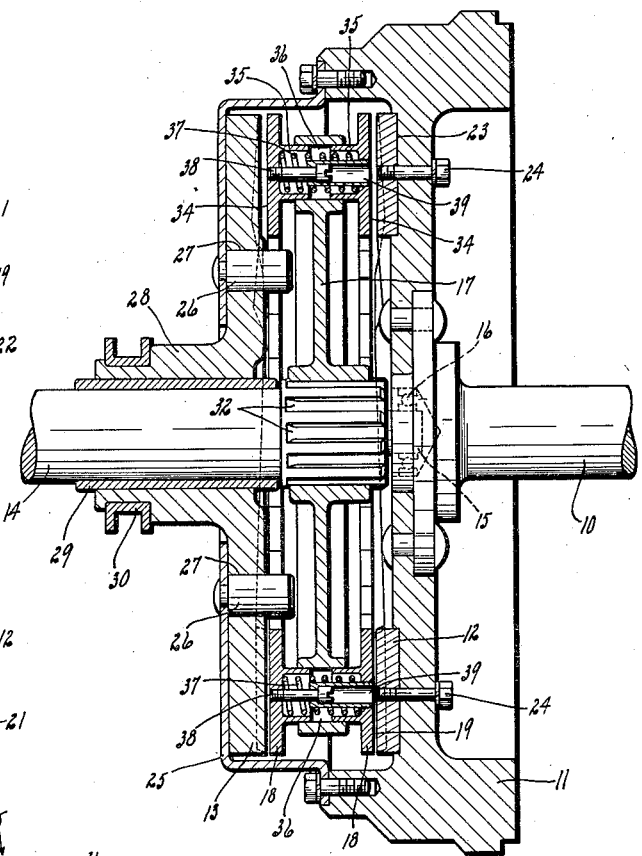
FIG.-1
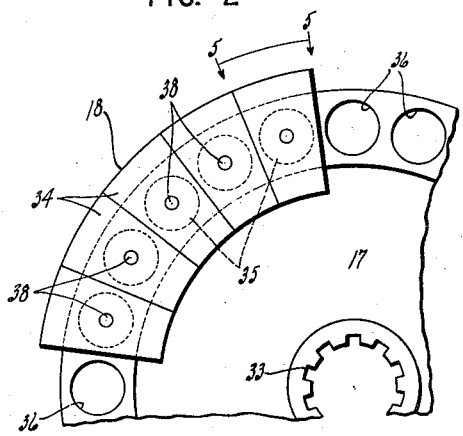
FIG.-3
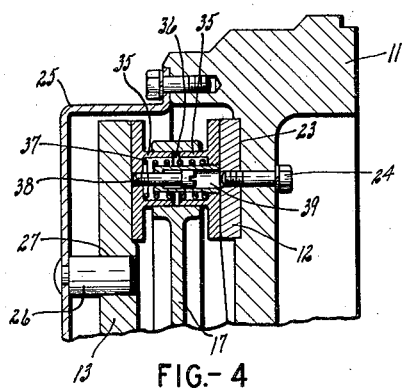
FIG.-4
FIG.-5
INVENTOR
DAVID J. DOLAN
BY
Brockett, Hyde, Higley & Meyer
ATTORNEYS Patented Aug. 11, 1936

2,050,426

UNITED STATES PATENT OFFICE 2,050,426

CLUTCH

David J. Dolan, Cleveland Heights, Ohio, assignor to The Cardel Company, Inc., Chester, Pa., a corporation of Delaware Application July 14, 1934, Serial No. 735,253

6 Claims. (Cl. 192—52)

This invention relates to a clutch of the friction type which is utilized for the transmission of power from a driving shaft to a driven shaft.

An object of the present invention is to provide improved clutch structure which is adapted to transmit power in an efficient manner, while at the same time permitting slippage between the driving and the driven member so as to gradually engage the parts in locked driving relation and to permit the rotation of the driven shaft at speeds less than that of the driving shaft.

Other objects and advantages of my invention will be apparent from a consideration of the drawing and the attached specification, and the essential features thereof will be summarized in the claims.

In the drawing, Fig. 1 is a sectional view through my improved clutch mechanism with the parts in non-driving relation; Fig. 2 is a side elevation of spaced cam plates which, in the present embodiment, are connected to the driving shaft; Fig. 3 is a partial elevation of a carrier ring and friction members mounted thereon which is adapted for placement between the cam plates of Fig. 2 in the assembled structure; Fig. 4 is a partial sectional view of the mechanism of Fig. 1 showing the parts in driving relation; while Fig. 5 is a view of one of the friction members taken substantially in the direction indicated at 5—5 on Fig. 3.

My improved clutch mechanism is useful in various applications but I have illustrated the same in connection with mechanism such as is found in automobiles. Referring particularly to Fig. 1, a driving shaft 10 is rigidly connected with a flywheel 11 which supports a pair of generally parallel cam plates 12 and 13 in planes normal to shaft 10 and spaced longitudinally thereof. A driven shaft 14 is aligned with shaft 10, one end thereof having a reduced portion 15 rotatably mounted in a bearing 16 carried by the driving shaft and flywheel unit which forms no part of the present invention. Upon the driven shaft 14 is mounted a carrier ring 17 adapted to be rotatable with shaft 14 and movable longitudinally thereof to a limited extent. An annular ring of pairs of compressible friction members indicated generally at 18 is mounted on the carrier ring in position between cam plates 12 and 13 so that relative approach of the cam plates causes frictional engagement of these plates with the friction members on the carrier ring which thus produces a rotative effect of the carrier ring and shaft 14. These parts will now be described more in detail.

Cam plate 12 comprises an annular member having a circumferentially extending undulatory cam surface which in the form shown has three high points 19 spaced 120° apart. The exact formation of the surface provided in the present instance comprises one increasing uniformly from a low point, for instance 21, Fig. 2, to a high point 19, and extending through an arc slightly less than 120°. Thereafter, the cam surface drops rapidly to the next low point 22 similar to that at 21. The cam plate 12 is held in a groove 23 in the flywheel by means of stud bolts 24. To the periphery of the flywheel is bolted a cover plate 25 which extends axially from the flywheel and then radially inwardly to support pins 26 rigidly secured thereto as by riveting. Cam plate 13 is provided with openings 27 for receiving pins 26 and is thereby rotated in unison with cam plate 12. Plate 13 is axially movable on pins 26 and is provided with a hub 28 rotatably mounted on shaft 14 by means of a suitable bearing 29 and freely movable longitudinally of the shaft as by means of an actuator, not shown, adapted to engage a collar 30. Cam plate 13 is provided with an annular cam surface indicated generally at 31 and similar in all respects to that described in connection with plate 12, the arrangement being such that the cam surfaces are on adjacent faces of the plates, with their three high points and low points respectively opposite.

The connection between the carrier ring 17 and driven shaft 14 for causing rotation while at the same time providing a limited relative longitudinal movement between the parts comprises longitudinally extending slots 32 in shaft 14 and correspondingly shaped key members 33 on the hub of the carrier ring adapted to engage the slots. Mounted on the carrier ring is an annular series of double ended plungers, or pairs of compressible friction members heretofore designated 18. Each friction member has an outer face 34 which is adapted to engage one of the cam surfaces on plate 12 or 13 and an inwardly extending sleeve 35 which is received in an opening 36 extending through the carrier ring. Each pair of friction members is yieldingly biased toward the adjacent cam surfaces by a spring 37, such outward movement of the friction members being suitably limited as by the head of screw 38, carried by one friction member, engaging a shoulder at the inner end of a sleeve 39 carried by the other friction member of the pair. The distance across a pair of friction members in their extended position as seen in Fig. 1 is less than the distance between opposed driving cam surfaces on plates 12 and 13 with the parts in non-driving position. The outer face of each friction member is provided with a surface which conforms to the inclination of the cam surface with which it is adapted to coact. In other words, the inclination of the outer surface of the friction member as seen in Fig. 5 corresponds to the slighter inclination of the longer cam surfaces of the cam plates.

Preferably, as indicated in the drawing, the number of plungers is greater than the number of cam high points, so that in slipping of the clutch, as during the engaging operation, the frequency of contact between plunger and cam points will be increased and periodic vibrations thus reduced in amplitude.

In operation, with the parts in the position of Fig 1 and with shaft 10, flywheel 11 and cam plates 12 and 13 rotating in non-driving relation, plate 13 is moved axially on pins 26 toward plate 12 by the application of force to the hub 28 by suitable means not shown. Thereupon, the pairs of friction members 18 are engaged by opposing cam surfaces on plates 12 and 13 and spring 37 is partially compressed. The carrier ring 17 floats axially on shaft 14 and each pair of friction members floats axially in the openings 36 of the carrier ring so that the parts adjust themselves to the various positions depending upon the degree of movement of cam plate 13. The friction members being compressed between the cam surfaces of the cam plates will drive the shaft 14 providing the torque required is not greater than the friction between the outer faces 34 of the friction members under the compression supplied by springs 37. If greater torque than this is required the friction members will be compressed so that they pass between the high points of the opposing cam surfaces and will expand upon arriving between the low points of the cam surfaces. This will continue until the load attached to shaft 14 is picked up and driven, assuming of course that the maximum torque required from shaft 14 can be taken care of by the friction supplied when the friction members are fully compressed.

The coacting friction parts are formed of suitable material, for instance, the cam plates 12 and 13 may be of steel and the faces 34 of the friction members may be of steel or a suitable bronze and the entire mechanism may preferably run in oil.

I have thus provided improved clutch mechanism which is adapted to gradually transmit power from a driving shaft to a driven shaft and which is adapted to rotate the driven shaft at varying speeds less than that of the driving shaft without damage to the clutch mechanism.

What I claim is:

1. In a clutch, the combination of aligned driving and driven shafts, two generally parallel cam plates supported by one of said shafts in planes normal thereto and spaced longitudinally thereof, said plates having circumferentially undulatory cam surfaces on their adjacent faces arranged with their high and low points respectively opposite, said cam plates being rotatable with their supporting shaft but relatively movable longitudinally thereof, a carrier ring mounted on the other of said shafts for rotation therewith and positioned between said cam plates, compressible friction members on said carrier ring adapted to engage both of said cam surfaces, and means for causing relative movement of said cam plates longitudinally of their supporting shaft.

2. In a clutch, the combination of aligned driving and driven shafts, two generally parallel cam plates supported by one of said shafts in planes normal thereto and spaced longitudinally thereof, said plates having circumferentially undulatory cam surfaces on their adjacent faces arranged with their high and low points respectively opposite, said cam plates being rotatable with their supporting shaft but relatively movable longitudinally thereof, a carrier ring mounted on the other of said shafts for rotation therewith and positioned between said cam plates, an annular ring of pairs of friction members mounted on said carrier ring between said cam surfaces, the members of each pair facing and adapted to engage said opposed cam surfaces and yieldingly biased theretoward, and means for causing relative movement of said cam plates longitudinally of their supporting shaft.

3. In a clutch, the combination of a drive shaft, two generally parallel cam plates spaced longitudinally of said shaft and having opposed annular undulatory cam surfaces arranged with their high and low points respectively opposite, said cam plates being rotatable with said drive shaft but relatively movable longitudinally thereof, a driven shaft aligned with said drive shaft, a carrier ring between said cam plates mounted on said driven shaft and rotatable therewith and arranged for limited movement therealong, an annular ring of pairs of friction members mounted on said carrier ring and positioned between said cam plates, the friction members of each pair being adapted to engage said opposed cam surfaces and being yieldingly biased theretoward, and means for causing relative movement of said cam plates longitudinally of said drive shaft.

4. In a clutch, the combination of two aligned shafts, a cam plate rigidly mounted on one of said shafts and extending normal thereto, means for mounting a second cam plate opposite said first-named cam plate generally parallel thereto and spaced axially therefrom, said second cam plate being arranged on said mounting means rotatable with said first-named cam plate and axially movable relative thereto, said plates having circumferentially undulatory cam surfaces on their adjacent faces arranged with their high and low points respectively opposite, a carrier ring rotatable with the other of said shafts and arranged for limited movement therealong, said carrier ring lying between said cam plates, an annular ring of pairs of friction members mounted on said carrier ring between said cam surfaces, the members of each pair having outer faces adapted to coact with said cam surfaces and yieldingly biased theretoward, said cam surfaces rising uniformly through an arc slightly less than 120° from a low point to a high point and dropping to a low point in the remainder of the 120° arc, and the outer faces of said friction members conforming to said rising surface.

5. In a clutch of the class described and having an outer unit with a pair of inwardly faced members and an inner unit member disposed therebetween and outwardly faced, said outer members being arranged for relative opening and closing adjustment against the inner member to control the drive, the engaging faces of one of said units being circumferentially undulatory, with a plurality of uniformly spaced high points and low points therebetween, and with their high and low points opposite, the other unit having a greater plurality of yieldable plunger means circumferentially distributed to simultaneously engage longitudinally opposed parts of said faces.

6. In a clutch of the class described and having an outer unit with a pair of inwardly faced members and an inner unit member disposed therebetween and outwardly faced, said outer members being arranged for relative opening and closing adjustment against the inner member to control the drive, means providing for said adjustment by the operator during driving operation of the clutch, the driving faces of one of said units being circumferentially undulatory, with their high and low points respectively opposite, the other unit having longitudinally yieldable plunger means arranged to simultaneously engage longitudinally opposed parts of said faces, the rising and declining parts of said undulatory driving faces being so proportioned that relative motion between said units during said drive will cause quicker release than depression of said plunger means.

DAVID J. DOLAN.